United States Patent
Zhao et al.

(10) Patent No.: US 8,044,853 B2
(45) Date of Patent: Oct. 25, 2011

(54) NAVIGATION RECEIVER

(75) Inventors: Liang Zhao, Campbell, CA (US);
Michael Kohlmann, Los Gatos, CA (US); Paul A. Conflitti, Los Gatos, CA (US); Roger Brockenbrough, Los Gatos, CA (US); Cormac S. Conroy, Campbell, CA (US); Leonid Sheynblat, Hillsborough, CA (US); Douglas Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 11/962,019

(22) Filed: Dec. 20, 2007

(65) Prior Publication Data
US 2009/0160704 A1    Jun. 25, 2009

(51) Int. Cl.
*G01S 19/24* (2010.01)
*G01S 19/09* (2010.01)

(52) U.S. Cl. .................. 342/357.63; 342/357.46

(58) Field of Classification Search .......... 342/357.06, 342/357.12, 357.13, 357.15, 357.29, 357.46, 342/357.63; 701/213, 215
See application file for complete search history.

(56) References Cited

U.S. PATENT DOCUMENTS

| | | | | |
|---|---|---|---|---|
| 4,807,256 A | * | 2/1989 | Holmes et al. | 375/344 |
| 4,972,431 A | * | 11/1990 | Keegan | 375/150 |
| 6,888,879 B1 | | 5/2005 | Lennen | |
| 6,917,815 B2 | | 7/2005 | Hajimiri et al. | |
| 7,626,542 B2 | * | 12/2009 | Kober et al. | 342/357.12 |

FOREIGN PATENT DOCUMENTS

| | | |
|---|---|---|
| EP | 0083480 A1 | 7/1983 |
| WO | WO0011800 A1 | 3/2000 |

OTHER PUBLICATIONS

International Search Report and Written Opinion—PCT/US2008/087539, International Search Authority—European Patent Office—May 28, 2009.
Schmid, A, et al.: "Enabling Location Based Services with a 'Combined Galileo/GPS Receiver Architecture" ION GNSS 17TH International Technical Meeting of the Satellite Division, Sep. 24, 2004, pp. 1468-1479, XP002525428.
Utsurogi Y et al: "CMOS Front-End Circuits of Dual-Band GPS Receiver" Jun. 1, 2005, IECE Transactions on Electronics, Electronics Society, Tokyo, JP, pp. 1275-1279, XP001230914 ISSN: 0916-8524.

* cited by examiner

*Primary Examiner* — Dao L Phan
(74) *Attorney, Agent, or Firm* — Linda G. Gunderson

(57) ABSTRACT

The subject matter disclosed herein relates to a system and method for processing navigation signals received from multiple global navigation satellite systems (GNSS'). In a particular implementation, signals received from multiple GNSS' may be processed in a single receiver channel.

24 Claims, 5 Drawing Sheets

NAVIGATION RECEIVER

BACKGROUND

1. Field

The subject matter disclosed herein relates to processing of navigation signals received at a location.

2. Information

A satellite positioning system (SPS) typically comprises a system of transmitters positioned to enable entities to determine their location on the Earth based, at least in part, on signals received from the transmitters. Such a transmitter typically transmits a signal marked with a repeating pseudorandom noise (PN) code of a set number of chips and may be located on ground based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS satellite, a receiver may form multiple pseudorange hypotheses. Using additional information, a receiver may eliminate such pseudorange hypotheses to, in effect, reduce an ambiguity associated with a true pseudorange measurement. With sufficient accuracy in knowledge of timing of a signal received from a GNSS satellite, some or all false pseudorange hypotheses may be eliminated.

FIG. 1 illustrates an application of an SPS system, whereby a mobile station (MS) 100 in a wireless communications system receives transmissions from satellites 102a, 102b, 102c, 102d in the line of sight to MS 100, and derives time measurements from four or more of the transmissions. MS 100 may provide such measurements to position determination entity (PDE) 104, which determines the position of the station from the measurements. Alternatively, the subscriber station 100 may determine its own position from this information.

MS 100 may search for a transmission from a particular satellite by correlating the PN code for the satellite with a received signal. The received signal typically comprises a composite of transmissions from one or more satellites within a line of sight to a receiver at MS 100 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

A correlation is typically performed over an integration time "I" which may be expressed as the product of $N_c$ and M, where $N_c$ is the coherent integration time, and M is the number of coherent integrations which are non-coherently combined. For a particular PN code, correlation values are typically associated with corresponding PN code shifts and Doppler bins to define a two-dimensional correlation function. Peaks of the correlation function are located and compared to a predetermined noise threshold. The threshold is typically selected so that the false alarm probability, the probability of falsely detecting a satellite transmission, is at or below a predetermined value. A time measurement for the satellite is typically derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

BRIEF DESCRIPTION OF THE FIGURES

Non-limiting and non-exhaustive features will be described with reference to the following figures, wherein like reference numerals refer to like parts throughout the various figures

SUMMARY

Figure 1:
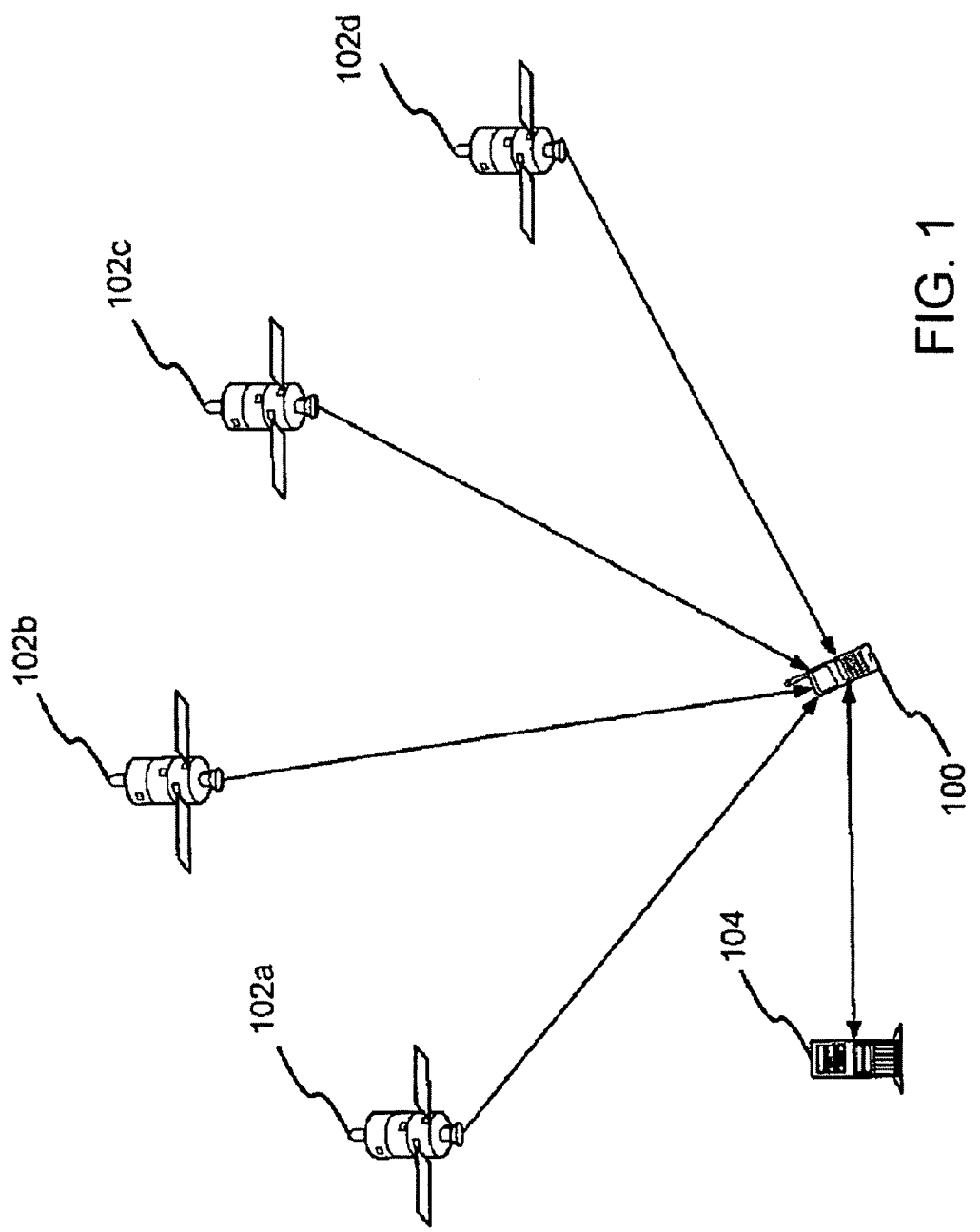
FIG. 1 is a schematic diagram of a satellite positioning system (SPS) according to one aspect.

In one particular implementation, a receiver is adapted to receive and process satellite positioning system (SPS) signals transmitted at different carrier frequencies. In one aspect, SPS signals transmitted on different carrier frequencies are downconverted for processing in a single receiver path. It should be understood, however, that this is merely one example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

A "space vehicle" (SV) as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary position on the Earth. However, these are merely examples of SVs and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). To determine its location, a satellite navigation receiver may obtain pseudorange measurements to three or more satellites as well as their positions at time of transmitting.

Techniques described herein may be used with any one of several SPS' and/or combinations of SPS'. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. Such distinct GNSS' may comprise, for example, the NAVSTAR Global Positioning System (GPS) operated by the U.S. Department of Defense, the planned Galileo system being developed by the European Satellite Navigation System for operation by the European Union and European Space Agency, the Glonass system developed by the Soviet Union and now operated by the Russian government and the planned Compass system being developed by the Chinese government. It should be understood, however, that these are merely examples of GNSS' that may be used in particular implementations, and that other GNSS', including GNSS' implemented in the future, may be used without deviating from claimed subject matter.

An SV which is a member of a particular GNSS constellation typically transmits navigation signals in a format that is unique to the particular GNSS format. Accordingly, techniques for acquiring a navigation signal transmitted by an SV in a first GNSS may be altered for acquiring a navigation signal transmitted by an SV in a second GNSS. In a particular example, although claimed subject matter is not limited in this respect, it should be understood that GPS, Galileo and Glonass each represent a GNSS which is distinct from the other two named SPS'. However, these are merely examples of SPS' associated with distinct GNSS' and claimed subject matter is not limited in this respect.

The existence of multiple GNSS' enables a receiver to receive SPS signals from multiple GNSS', if SVs of such multiple GNSS' are in view of the receiver. As such, the existence of SVs from different GNSS may provide enhanced global coverage and a multitude of opportunities for taking pseudorange measurements to SVs positioned at known locations in GNSS constellations. Accordingly, a navigation receiver capable of processing SPS signals from different GNSS' may have the advantage of being able to determine a location based, at least in part, on pseudorange measurements to such SVs of different GNSS'. Here, as SPS signals from different GNSS' may employ different signaling formats, a receiver may employ different processing of a received SPS signal to obtain a pseudorange measurement based upon the particular GNSS transmitting the SPS signal. This is further complicated by the transmission of SPS signals from different GNSS on different carrier frequencies. Here, using independent and dedicated processing for SPS signals transmitted by each GNSS may incrementally add to the cost of manufacturing, power consumption and weight associated with navigation receivers.

Figure 2:
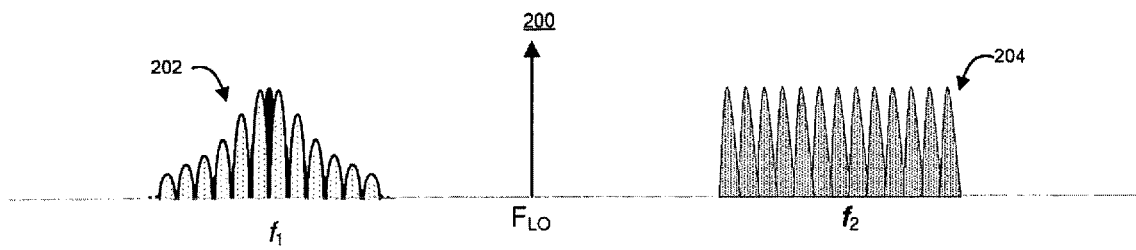
FIG. 2 shows spectra associated with SPS signals originating at multiple GNSS' according to one aspect.

FIG. 2 shows spectra associated with SPS signals originating at multiple GNSS' according to one aspect. Here, an SPS signal received from a first GNSS, $GNSS_1$, may have a spectrum 202 that is centered about a first carrier frequency $f_1$ while a second SPS signal received from a second, different GNSS, $GNSS_2$, may have a spectrum 204 that is centered about a second carrier frequency $f_2$. In one particular implementation, spectra 202 and 204 may be received at a single receiver channel and/or single receiver path to enable determination of pseudorange measurements to a first SV in $GNSS_1$ and determination of a second SV in $GNSS_2$. Accordingly, these pseudorange measurements obtained from SPS signals received from different GNSS' may be used to determine a location of the receiver.

In one aspect, a single receiver channel and/or single receiver path may comprise a single series of receiver components to simultaneously process multiple SPS signals received from an associated multiple GNSS'. In a particular implementation, such a single receiver channel and/or single receiver path may comprise a radio frequency (RF) filter, followed by a single downconversion stage to mix multiple SPS signals received from multiple GNSS' with a local oscillator, and one or more filters to filter signals derived from the multiple SPS signals. However, this is merely an example of a single receiver channel and/or single receiver path, and claimed subject matter is not limited in this respect.

Figure 3:
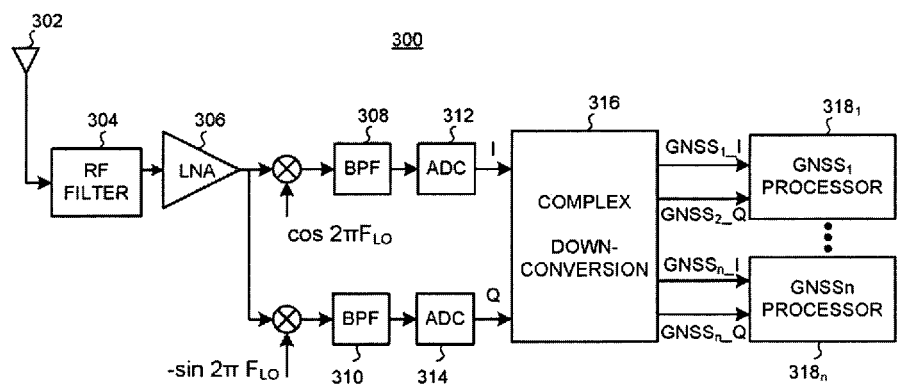
FIG. 3 is a schematic diagram of a receiver adapted to process SPS signals received from multiple GNSS' according to one implementation.

In one implementation, SPS signals received from $GNSS_1$ and $GNSS_2$ may be processed in a single receiver channel by mixing the received signals with a local oscillator (LO) signal having a frequency $F_{LO}$ that is determined based, at least in part, on $f_1$ and $f_2$. As shown in FIG. 3 according to a particular implementation, receiver 300 may receive SPS signals from $GNSS_1$ and $GNSS_2$ at a single radio frequency (RF) antenna 302, a bandpass RF filter such as surface acoustic wave (SAW) filter 304 and low-noise amplifier 306. The received SPS signals may then be complexly downconverted to intermediate frequencies by mixing the received signals with the LO signal as shown.

In this context, a "downconversion" may relate to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to an intermediate frequency (IF) signal, or transformation of an IF signal to a baseband signal and/or baseband information. However, these are merely examples of a downconversion and claimed subject matter is not limited in this respect.

In a particular implementation, by selecting $F_{LO}$ at about a midpoint between $f_1$ and $f_2$, portions of signals downconverted from spectra 202 and 204 may substantially covered by bandpass filters 308 and 310. Here, for example, a selection of a particular frequency for $F_{LO}$ may result in an image frequency component of one downconverted SPS signal that may substantially overlapping a desired signal component of another downconverted SPS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$, and claimed subject matter is not limited in this respect.

In-phase and quadrature components filtered by associated BPFs 308 and 310 may then be digitally sampled at analog to digital conversion circuits (ADCs) 312 and 314 to provide digitally sampled in-phase and quadrature components for further processing as illustrated below. Here, ADCs 312 and 314 may be adapted to sample output signals of BPFs 308 and 310 at or above the Nyquist rate of the combined signal. Also, the presently illustrated implementation includes ADCs 312 and 314 between first and second downconversion stages. It should be understood, however, that other architectures may be implemented without deviating from claimed subject matter. In other implementations, for example, analog to digital conversion may occur following a second downconversion. Again, these are merely example implementations and claimed subject matter is not limited in these respects.

Also, in alternative implementations, ADCs 312 and 314 may be replaced with a single complex ADC or with a single time shared and/or multiplexed ADC with appropriate delays to be shared between in-phase and quadrature signal paths.

In particular implementations, $GNSS_1$ and $GNSS_2$ may comprise anyone of several pairs of different GNSS'. In one particular embodiment, although claimed subject matter is not limited in this respect, $GNSS_1$ and $GNSS_2$ may be selected such that $f_1$ and $f_2$ are near in frequency to enable low cost manufacture of SAW 304 and/or LNA 306 by limiting an operating band. Here, for example, $GNSS_1$ and $GNSS_2$ may comprise any one of several pairs such as GPS L1 and Glonass L1 (where $f_1 \approx 1575$ MHz and $f_2 \approx 1602$ MHz), GPS L1 and Compass L1 (where $f_1 \approx 1575$ MHz and $f_2 \approx 1590$ or 1561 MHz), Galileo L1 and Glonass L1 (where $f_1 \approx 1575$ MHz and $f_2 \approx 1602$ MHz), GPS L2 and Glonass L2 (where $f_1 \approx 1228$ MHz and $f_2 \approx 1246$ MHz) and GPS L2 and Compass L2 (where $f_1 \approx 1228$ MHz and $f_2 \approx 1269$ or 1207 MHz). It should be understood, however, that these are merely particular examples of GNSS pairs that may be selected in particular implementations, and claimed subject matter is not limited to any particular GNSS pair.

While $GNSS_1$ and $GNSS_2$ may be selected such that $f_1$ and $f_2$ are near in frequency (e.g., both being in an L1 band or both being in an L2 band) as illustrated above in particular embodiments, claimed subject matter is not limited in this respect. In alternative embodiments, SPS signals transmitted at more greatly separated carrier frequencies may be downconverted to a common intermediate frequency in a single receiver channel as illustrated above. In one particular example, an SV in a GNSS constellation may transmit multiple SPS signals at different carrier frequencies and/or frequency bands such as, for example, L1 and L2 frequency bands (in GPS, for example, L1 is located at 1575.42 MHz and L2 is located at 1227.6 MHz). Here, it should be understood, therefore, that techniques described herein may be applicable to the processing of SPS signals received from the same GNSS, but transmitted on different frequency bands (e.g., GPS signals at L1 and L2). It should also be understood that a resulting composite signal may have a larger bandwidth, thus increasing a Nyquist rate for sampling at ADCs 312 and 314.

In particular embodiments, the bandwidth of BPFs 308 and 310 may be centered at about a common intermediate frequency $IF_o$ to process portions of SPS signals received from both $GNSS_1$ and $GNSS_2$. In addition, the bandwidth of BPFs 308 and 310 may be implemented to be wide enough to capture enough information SPS signals received from both $GNSS_1$ and $GNSS_2$ without introducing significant noise outside the bands of spectra 202 and 204. Additionally, BPFs 308 and 310 may be chosen to be narrow enough to enable sampling by ADCs 312 and 314 at a given sample rate (e.g., at about the Nyquist rate) without significant distortion.

According to particular implementations, sampled in-phase and quadrature components provided by ADCs 312 and 314 may be further processed according to a complex downconversion 316 prior to GNSS-specific baseband processing at GNSS processors $318_1$ though $318_n$. In one implementation, a GNSS processor $318_j$ may be used to perform baseband processing for a particular GNSS or portion thereof. For example, it is possible that a GNSS processor $318_i$ is adapted to process SPS signals according to GPS L1 while a different GNSS processor $318_j$ may be adapted to process SPS signals according to Galileo L1. In another embodiment, SPS signals received from three or more GNSS may be processed by associated GNSS processors 318. In another embodiment, individual GNSS processors 318 may be used to individually replicate each of eight downconversions for each of eight individual sub bands of a received Glonass signal.

Figure 4:
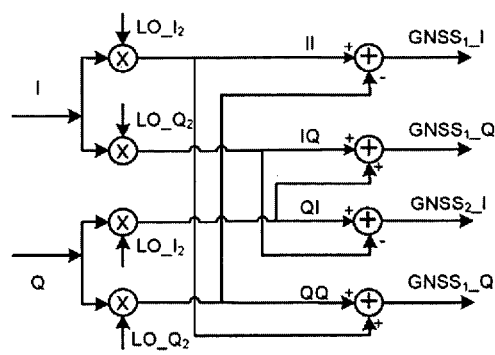
FIG. 4 is a schematic diagram of a complex down-converter adapted to provide downconverted samples for GNSS specific processing according to one implementation.

In particular implementations, baseband signals of different $GNSS_1$ to $GNSS_n$ may be associated with different local oscillator frequencies. As such, complex downconversion 316 shown in FIG. 3 may combine different local oscillator frequencies with sampled in-phase and quadrature components provided by ADCs 312 and 314 to recover baseband signals associated with the different $GNSS_1$ to $GNSS_n$. In a particular example of a downconversion circuit as shown in FIG. 4., however, different baseband signals are associated with the same local oscillator frequency. Here, it should be understood that the particular downconversion circuit shown in FIG. 4 is merely an example downconversion circuit according to a particular implementation and that claimed subject matter is not limited in this respect.

FIG. 4 shows a complex downconversion according to one particular implementation of complex downconversion 316 in which complex downconversion is performed for two GNSS' (e.g., n=2 for $GNSS_1$ and $GNSS_2$), and in-phase and quadrature samples are mixed and combined as shown to provide output samples for processing according to $GNSS_1$ ($GNSS_1\_I$ and $GNSS_1\_Q$) and output samples for processing according to $GNSS_2$ ($GNSS_2\_I$ and $GNSS_2\_Q$). Here, frequencies for $LO\_I_1$, $LO\_Q_1$, $LO\_I_2$ and $LO\_Q_2$ for particular GNSS' may depend on particular signed offsets of sub band center frequencies, and intermediate frequencies resulting from mixing with LO at the earlier RF to IF downconversion stage.

In this particular implementation, mixer output signals $LO\_I_1$, $LO\_Q_1$, $LO\_I_2$ and $LO\_Q_2$ are combined by addition and/or subtraction to provide particular output samples according to a particular choice of system parameters such as, for example, frequency $F_{LO}$. It should be understood, however, that mixer output signals may be combined differently in other implementations and that claimed subject matter is not limited in this respect.

In a particular implementation illustrated in FIG. 4 where local oscillators for $GNSS_1$ and $GNSS_2$ are very close or the same, frequencies for $LO\_I_1$, $LO\_Q_1$, $LO\_I_2$ and $LO\_Q_2$ may be the same. As such, the particular implementation of a complex downconversion circuit shown in FIG. 4 may be adapted to downconvert first and second intermediate frequency (IF) signals to associated first and second baseband signals. Here, only four multipliers are used to combine the first and second IF signals with a local oscillator to provide an associated four multiplier output signals. A first pair adder provides the first baseband signal based, at least in part, on the four multiplier output signals. A second pair of adders provides the second baseband signal based, at least in part, on the four multiplier output signals.

In particular embodiments, output samples from complex downconversion 316 may be further processed prior to GNSS-specific processing. In one particular implementation used to process in-phase and quadrature samples to provide output samples for processing according to Glonass, additional processing may be used to extract individual signals which are frequency division multiplexed in the SPS signal received from Glonass. Here, for example, output samples $GNSS_2\_I$ and $GNSS_2\_Q$ for Glonass may be further processed to provide N output samples associated with N frequency sub-bands of a received SPS signal. Here, for example, such additional processing may comprise, for example, digital Fourier transform and/or other digital filters.

As pointed out above, output samples provided by complex downconversion 316 may be baseband processed according to specific GNSS signal processing requirements to, for example, determine pseudorange measurements to assist in determining a location of a receiver. As illustrated below according to a particular example, such baseband processing may include determining a Doppler frequency measurement and code phase detection associated with a received SPS signal.

According to an example, an SV visible at a receiver may be associated with a particular set of search window parameters defining a two-dimensional domain of code phase and Doppler frequency hypotheses to be searched for the SV. In one implementation, illustrated in FIG. 5, search window parameters for an SV comprise a code phase search window size, $WIN\_SIZE_{CP}$, a code phase window center, $WIN\_CENT_{CP}$, a Doppler search window size, $WIN\_SIZE_{DOPP}$, and a Doppler window center, $WIN\_CENT_{DOPP}$. In one implementation, these parameters may be indicated by an acquisition assistance message provided to the subscriber station by a PDE.

Figure 5:
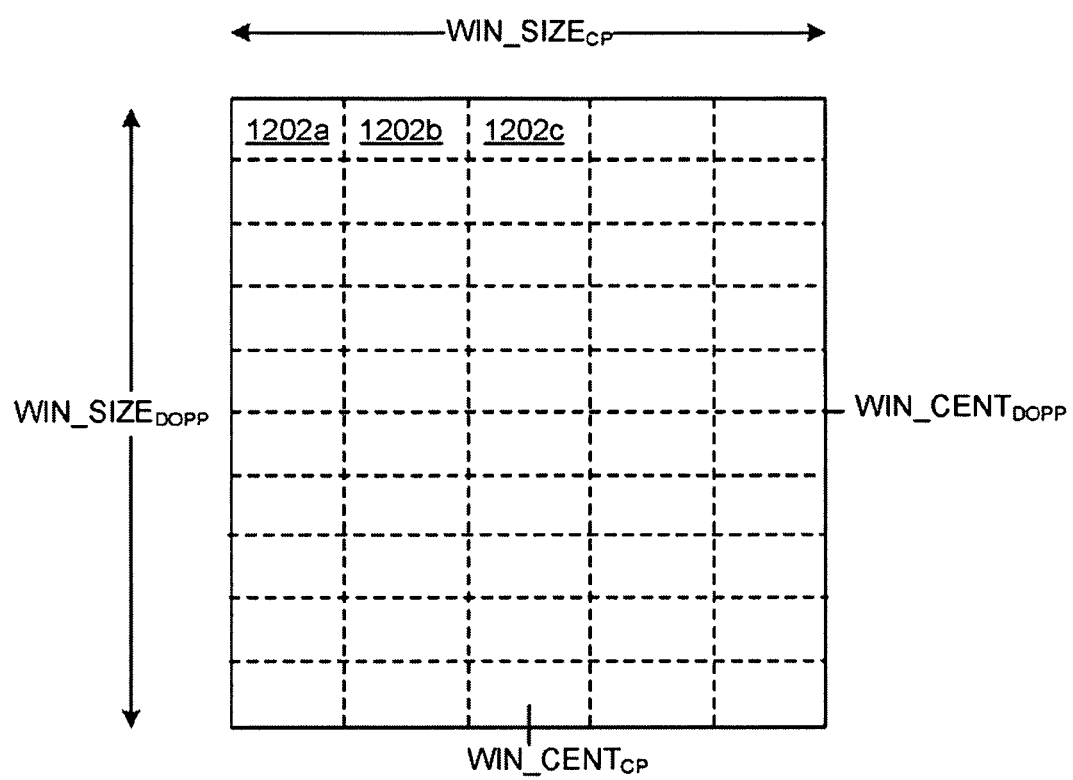
FIG. 5 is a schematic diagram of a two-dimensional domain to be searched for detection of a signal transmitted from a space vehicle according to one aspect.

The two-dimensional search space for an SV illustrated in FIG. 5 shows a code phase axis is a horizontal axis, and a Doppler frequency axis as a vertical axis, but this assignment is arbitrary and could be reversed. The center of the code phase search window is referred to as $WIN\_CENT_{CP}$, and the size of the code phase search window is referred to as $WIN\_SIZE_{CP}$. The center of the Doppler frequency search window is referred to as $WIN\_CENT_{DOPP}$, and the size of the Doppler frequency search window is referred to as $WIN\_SIZE_{DOPP}$.

Figure 6:
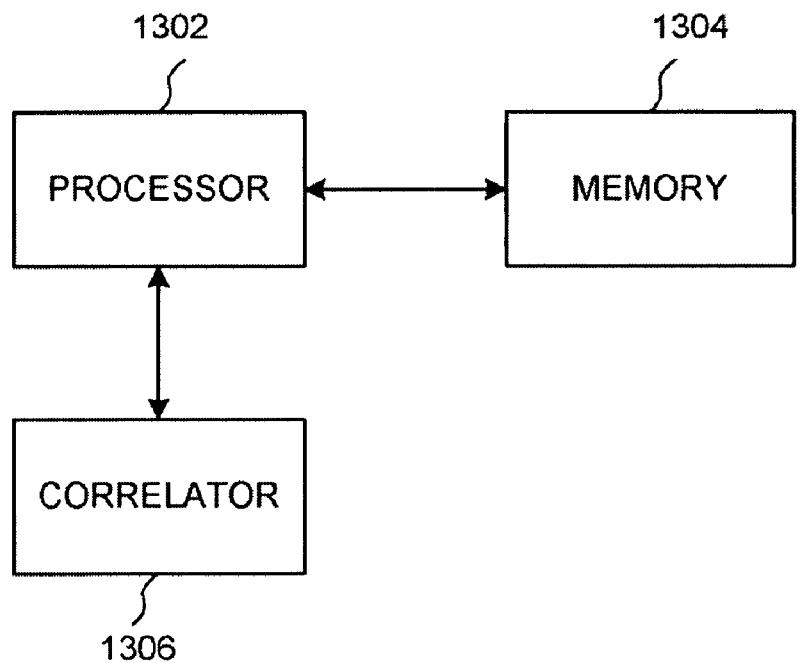
FIG. 6 is a schematic diagram of a system for processing signals to determine a position location according to one aspect.

A system for acquiring periodically repeating signals from SVs is illustrated in FIG. 6 according to a particular example. However, this is merely an implementation of a system that is capable of acquiring such signals according to a particular example and other systems may be used without deviating from claimed subject matter. As illustrated in FIG. 6 according to a particular implementation, such a system may comprise a computing platform including a processor 1302, memory 1304, and correlator 1306. Correlator 1306 may be adapted to produce correlation functions from signals provided by a receiver (not shown) to be processed by processor 1302, either directly or through memory 1304. Correlator 1306 may be implemented in hardware, software, or a combination of hardware and software. However, these are merely examples of how a correlator may be implemented according to particular aspects and claimed subject matter is not limited in these respects.

According to an example, memory 1304 may store machine-readable instructions which are accessible and executable by processor 1302 to provide at least a portion of a computing platform. In a particular example, although claimed subject matter is not limited in these respects, processor 1302 may direct correlator 1306 to search for position determination signals as illustrated above and derive measurements from correlation functions generated by correlator 1306.

Figure 7:
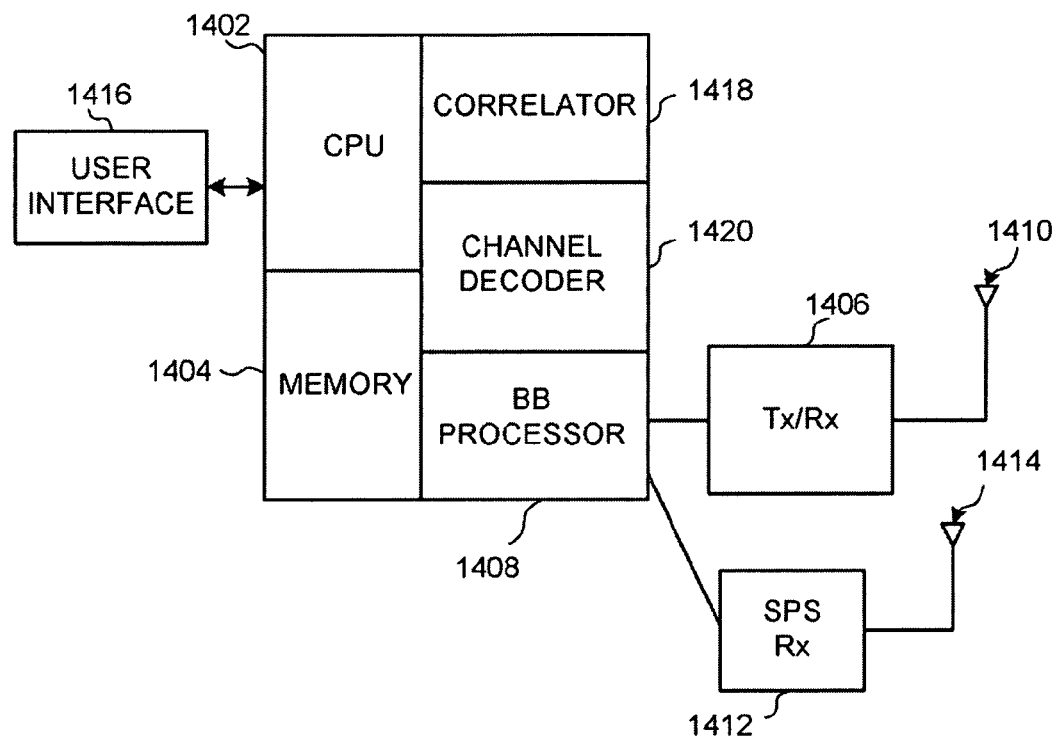
FIG. 7 is a schematic diagram of a mobile station according to one aspect.

Implementations of a navigation receiver as described herein may be incorporated in any one of several devices such as, for example, a mobile station (MS), base station and/or car navigation systems. Such an MS may comprise any one of several devices such as, for example, a mobile phone, notebook computer, personal digital assistant, personal navigation device and/or the like. Here, FIG. 7 shows a particular implementation of an MS in which radio transceiver 1406 may be adapted to modulate an RF carrier signal with baseband information, such as voice or data, onto an RF carrier, and demodulate a modulated RF carrier to obtain such baseband information. An antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1406 for transmission over a wireless communications link. Here, CPU 1402 may obtain such baseband information from an input device within user interface 1416. Baseband processor 1408 may also be adapted to provide baseband information from transceiver 1406 to CPU 1402 for transmission through an output device within user interface 1416.

User interface 1416 may comprise a plurality of devices for inputting or outputting user information such as voice or data. Such devices may include, for example, a keyboard, a display screen, a microphone, and a speaker.

SPS receiver (SPS Rx) 1412 may be adapted to receive and demodulate transmissions from SUVs through SPS antenna 1414, and provide demodulated information to correlator 1418. Correlator 1418 may be adapted to derive correlation functions from the information provided by receiver 1412. For a given PN code, for example, correlator 1418 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 1418 may also be adapted to derived pilot-related correlation functions from information relating to pilot signals provided by transceiver 1406. This information may be used by a subscriber station to acquire wireless communications services.

Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, examples, implementations, or examples thereof which have been described or suggested. CPU 1402 may be adapted to access and execute such machine-readable instructions. Through execution of these machine-readable instructions, CPU 1402 may direct correlator 1418 to analyze the SPS correlation functions provided by correlator 1418, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1402 at a subscriber station may estimate a location the subscriber station based, at least in part, on signals received from SVs as illustrated above. CPU 1402 may also be adapted to determine a code search range for acquiring a second received signal based, at least in part, on a code phase detected in a first received signals as illustrated above according to particular examples. It should be understood, however, that these are merely examples of systems for estimating a location based, at least in part, on pseudorange measurements, determining quantitative assessments of such pseudorange measurements and terminating a process to improve accuracy of pseudorange measurements according to particular aspects, and that claimed subject matter is not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A mobile station comprising:
   a first receiver adapted to receive information over terrestrial wireless links, said receiver being further adapted to receive acquisition assistance (AA) information; and
   a second receiver adapted to receive two or more satellite positioning system (SPS) signals at an associated two or more carrier frequencies, the second receiver comprising:
      a circuit to downconvert said two or more received SPS signals in a single receiver path according to a common local oscillator frequency; and
      a baseband processor to determine pseudorange measurements associated with said received SPS signals based, at least in part, on said downconverted signals and said AA information.

2. The mobile station of claim 1, wherein an image portion of a first downconverted signal substantially overlaps a desired portion of a second downconverted signal.

3. The mobile station of claim 1, wherein said second receiver further comprises a bandpass filter adapted to receive said two or more SPS signals over a band including said carrier frequencies associated with said two or more SPS signals.

4. The mobile station of claim 3, wherein said bandpass filter comprises a single surface acoustic wave (SAW) filter.

5. A mobile station comprising:
   a first receiver adapted to receive information over terrestrial wireless links, said receiver being further adapted to receive acquisition assistance (AA) information; and
   a second receiver comprising:
      a low noise amplifier adapted to simultaneously receive a plurality of SPS signals originating at a plurality of associated global navigation satellite systems (GNSS's) and having different carrier frequencies;
      a common complex signal path to process said simultaneously received SPS signals, said complex signal path comprising a mixer adapted to generate in-phase and quadrature signal paths based, at least in part, on said received SPS signals;

one or more analog to digital conversion (ADC) circuits adapted to provide sampled in-phase and quadrature components based, at least in part, on signals processed in said in-phase and quadrature signal paths; and a baseband processor to determine pseudorange measurements associated with said received SPS signals based, at least in part, on said processed signals and said AA information.

6. The mobile station of claim 5, further comprising a complex downconversion circuit configured to generate a plurality of downconverted in-phase and quadrature signal paths for baseband processing according to said plurality of associated GNSS's.

7. The mobile station of claim 6, wherein said complex downconversion circuit is configured to generate said downconverted in-phase and quadrature signal paths based, at least in part, on said sampled in-phase and quadrature components.

8. The mobile station of claim 6, wherein said one or more ADC circuits are configured to generate said sampled in-phase and quadrature components based, at least in part, on signals in said plurality of downconverted in-phase and quadrature signal paths.

9. The mobile station of claim 6, wherein said one or more ADC circuits comprise a first ADC circuit configured to sample signals transmitted in an in-phase signal path and a second ADC configured to sample signals transmitted in a quadrature signal path.

10. The mobile station of claim 1, wherein the second receiver further comprises a low noise amplifier (LNA) configured to receive the two or more SPS signals.

11. The mobile station of claim 4, wherein the second receiver further comprises an analog to digital conversion (ADC) circuit configured to provide sampled in-phase and quadrature components based, at least in part, on signals processed in said bandpass filter.

12. The mobile station of claim 11, wherein the circuit to downconvert said two or more received SPS signals in a single receiver path is configured to generate a plurality of downconverted in-phase and quadrature signal paths based, at least in part, on said sampled in-phase and quadrature components.

13. A method of processing satellite positioning system signals, the method comprising:

receiving information, including acquisition assistance (AA) information, at a first receiver over a terrestrial wireless link;

receiving a plurality of satellite positioning system (SPS) signals with a plurality of different carrier frequencies;

downconverting the plurality of SPS signals in a single receiver path using a single local oscillator frequency to produce downconverted signals; and determining pseudorange measurements associated with the plurality of SPS signals based, at least in part, on the downconverted signals and the AA information.

14. The method of claim 13 further comprising:

separating the plurality of SPS signals into a first composite signal of in-phase components of the plurality of SPS signals and a second composite signal of quadrature components of the plurality of SPS signals; and converting the first and second signals from analog to digital to provide sampled in-phase components and sampled quadrature components.

15. The method of claim 13 wherein receiving the plurality of SPS signals comprises receiving a Glonass GNSS signal and receiving one of a GPS GNSS signal or a Galileo GNSS signal.

16. The method of claim 13 wherein receiving the plurality of SPS signals comprises receiving a COMPASS GNSS signal and receiving GPS GNSS signal.

17. The method of claim 13 wherein receiving the plurality of SPS signals comprises receiving at least three SPS signals each having a different carrier frequency.

18. An apparatus comprising:

means for receiving information, including acquisition assistance (AA) information, at a first receiver over a terrestrial wireless link;

means for receiving a plurality of satellite positioning system (SPS) signals with a plurality of different carrier frequencies;

means for downconverting the plurality of SPS signals in a single receiver path using a single local oscillator frequency to produce downconverted signals; and means for determining pseudorange measurements associated with the plurality of SPS signals based, at least in part, on the downconverted signals and the AA information.

19. The apparatus of claim 18 further comprising:

means for separating the plurality of SPS signals into a first composite signal of in-phase components of the plurality of SPS signals and a second composite signal of quadrature components of the plurality of SPS signals; and means for converting the first and second signals from analog to digital to provide sampled in-phase components and sampled quadrature components.

20. The apparatus of claim 18 wherein means for receiving the plurality of SPS signals comprises means for receiving at least three SPS signals each having a different carrier frequency and the means for downconverting are configured to downconvert the at least three SPS signals in the single receiver path.

21. The apparatus of claim 18 wherein the apparatus comprises an in-car navigation system.

22. A computer program product residing on a processor-readable medium and comprising processor-readable instructions configured to cause a processor to:

obtain information, including acquisition assistance (AA) information, from a terrestrial wireless receiver;

downconvert a plurality of satellite positioning system (SPS) signals, with a plurality of different carrier frequencies, in a single receiver path using a single local oscillator frequency to produce downconverted signals; and determine pseudorange measurements associated with the plurality of SPS signals based, at least in part, on the downconverted signals and the AA information.

23. The computer program product of claim 22 further comprising instructions configured to cause the processor to:

separate the plurality of SPS signals into a first composite signal of in-phase components of the plurality of SPS signals and a second composite signal of quadrature components of the plurality of SPS signals; and convert the first and second signals from analog to digital to provide sampled in-phase components and sampled quadrature components.

24. The computer program product of claim 22 wherein the instructions configured to cause the processor to downconvert are configured the processor to downconvert at least three SPS signals, each having a different carrier frequency, in the single receiver path.

* * * * *